United States Patent [19]
Meyer et al.

[11] Patent Number: 5,398,404
[45] Date of Patent: Mar. 21, 1995

[54] APPARATUS FOR BRAZING ROTOR BARS TO END RINGS OF A ROTOR FOR AN ASYNCHRONOUS AC MOTOR

[75] Inventors: James A. Meyer, Erie; Paul L. Flynn, Fairview; James Kobrinetz; Anthony W. Giammarise, both of Erie; James M. Nuber, Waterford, all of Pa.; Shaun P. Luther, Jr., Lydonville, Vt.

[73] Assignee: General Electric Company, Erie, Pa.

[21] Appl. No.: 168,987

[22] Filed: Dec. 16, 1993

Related U.S. Application Data

[62] Division of Ser. No. 917,701, Jul. 21, 1992, Pat. No. 5,283,941.

[51] Int. Cl.⁶ .............................................. H02K 15/02
[52] U.S. Cl. ........................................ 29/732; 29/598; 228/49.5; 228/212; 228/235.1
[58] Field of Search .................. 29/598, 732; 228/212, 228/235.1, 180.1, 49.5; 310/211, 212, 42

[56] References Cited

U.S. PATENT DOCUMENTS 4,249,098  2/1981  Karlen et al. .................... 310/183

FOREIGN PATENT DOCUMENTS 1565773   3/1969  France .
658959   12/1978  Germany .
3834466  11/1989  Germany .
4019112A  6/1990  Germany .

OTHER PUBLICATIONS

"Influence of Aging Temperature and Time on Hardness and Electrical Conductivity of Cu–Cr Alloys" by J. Rys, et al, Metals Technology, Jan. 1980.
"Effect of Brazing Cycle on Tensile Properties of Copper Conductor Allows" by J. H. Hill, et al, Metal Treatment and Drop Forging, Apr. 1965.

Primary Examiner—Carl E. Hall
Attorney, Agent, or Firm—Ann M. Kratz; Marvin Snyder

[57] ABSTRACT

A method for brazing end rings to rotor bars for a squirrel cage rotor assembly comprises assembling the rotor in a brazing fixture with a braze shim between the rotor bars and the end rings; preheating the rotor and brazing fixture to a temperature that is below the aged temperature of the rotor bars and end rings and which is sufficiently high so that the difference in thermal expansion of the rotor bars and brazing fixture applies a predetermined amount of pressure on the brazing joint such that after the joint is brazed and has cooled, a braze filler having a predetermined thickness inches will bond the rotor bar end faces to the end ring, and brazing each joint to bond the rotor bar end faces to the end ring. A braze fixture for maintaining a predetermined pressure on a squirrel cage rotor assembly during the process of brazing rotor bars to end rings to form a brazed joint, which rotor assembly includes rotor bars disposed in a rotor core and having their ends positioned on braze shims on end rings, comprises positioning means for positioning the rotor assembly in the apparatus; pressure means for applying a predetermined amount of pressure on the end rings, rotor bars and braze shims of the rotor assembly so that when the ends of the rotor bars, braze shims and end rings are brazed to form a joint, the resulting brazed joint has a predetermined thickness.

2 Claims, 3 Drawing Sheets

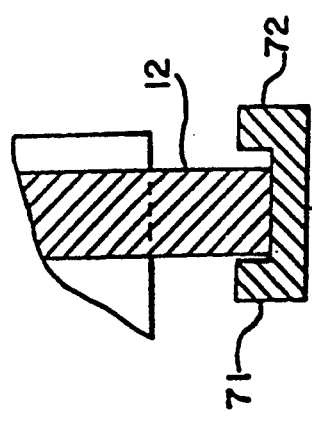
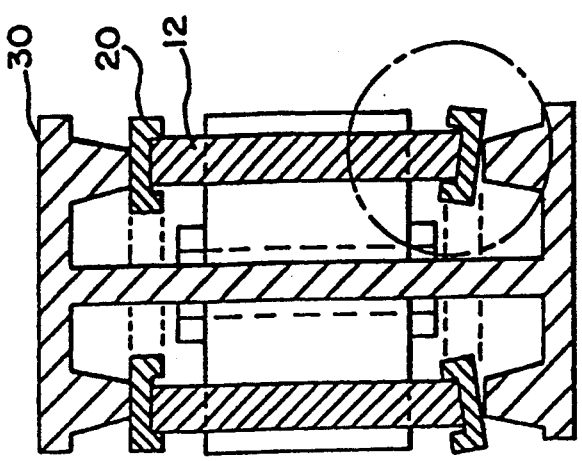
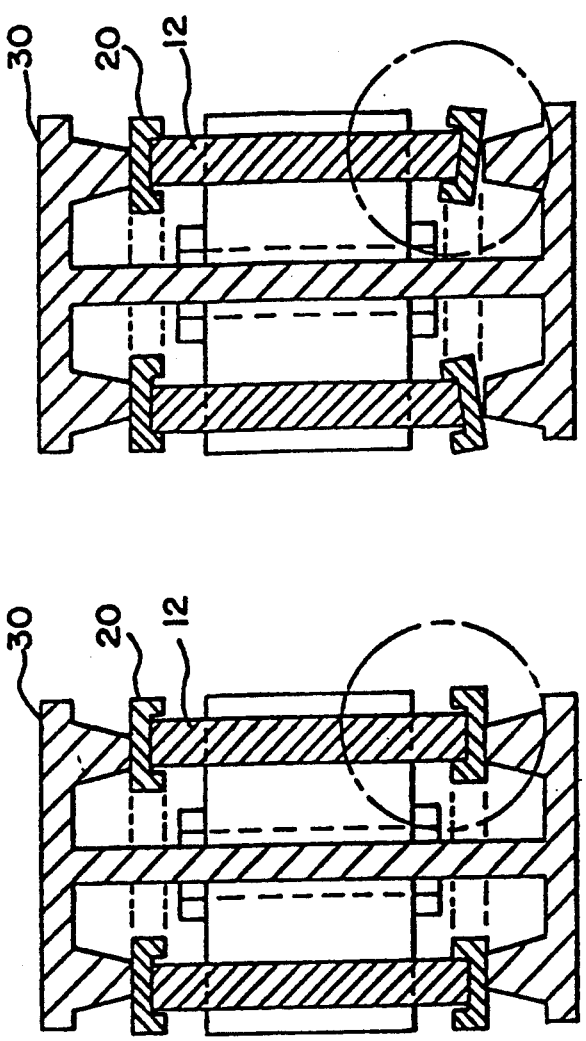
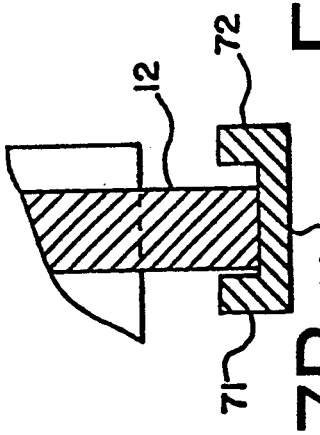
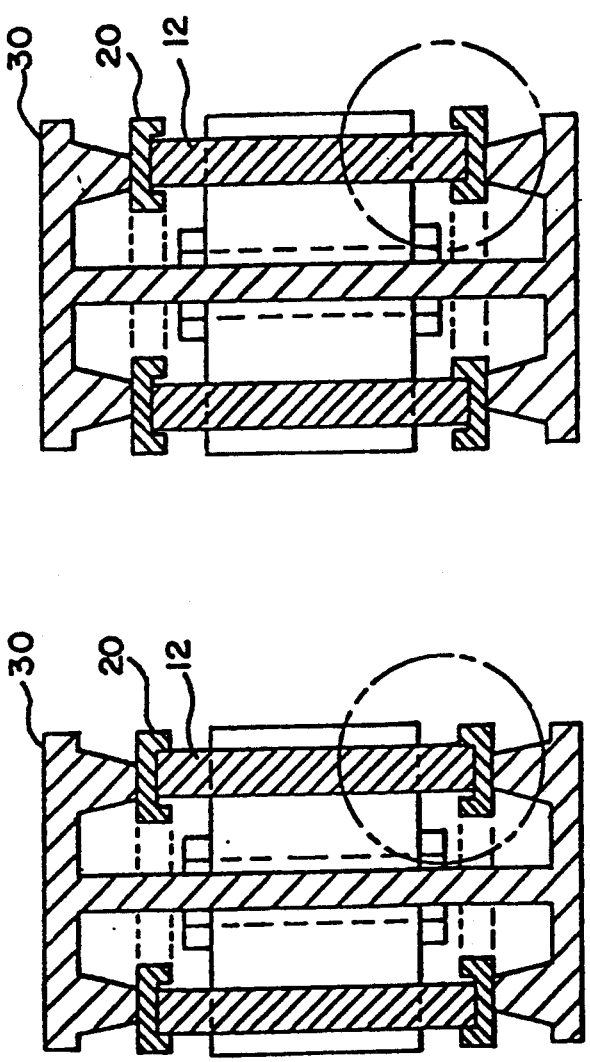
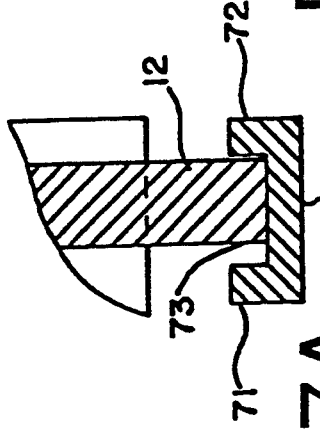

APPARATUS FOR BRAZING ROTOR BARS TO END RINGS OF A ROTOR FOR AN ASYNCHRONOUS AC MOTOR

This application is a division of application Ser. No. 07/917,701, filed Jul. 21, 1992, now U.S. Pat. No. 5,283,941.

This invention relates to squirrel cage asynchronous motors.

More particularly, this invention relates to improvements in the process of brazing rotor bars to end rings to form rotors for squirrel cage asynchronous motors and to rotor cages formed by that process.

BACKGROUND PRIOR ART PROBLEM

Squirrel cage rotors comprise circumferentially spaced rotor bars secured within a laminated iron core which are electrically and mechanically connected to end rings.

Depending on the mechanical and electrical properties desired, rotor bars may be made of various copper alloys and heat treated at different temperatures. The temperature at which the rotor bars and end rings are heat treated is known as the "aging or aged temperature". Some rotor bars and end rings for squirrel cage rotors have been made of a chrome copper alloy which has been heat treated to temperatures in the range of 900 degrees to establish the desired mechanical and electrical properties of the rotor bars and end rings. Other rotor bars and end rings have been made of copper, copper alloys or other materials, which are work-hardened to establish the mechanical and electrical properties. In some cases, a combination of work hardening and heat treatment is used. In any event, heating rotor bars and end rings beyond a certain temperature will change their properties. The temperature at which those properties deleteriously change, regardless of the method by which they are obtained (heating, work hardening or otherwise), is referred to herein as the "overaging or overaged temperature".

Brazing is one process by which rotor bars may be joined to the end rings of the rotor. Brazing is defined by the American Welding Society as "A group of welding processes which produces coalescence of material by heating them in the presence of a filler metal having a liquidus above 840° F. (450° C.) and below the base metal. The filler metal is distributed between the closely fitted faying surfaces of the joint by capillary action."

The braze filler metal determines the temperature required for brazing.

The melting temperatures of commonly used braze filler metals used to braze rotor bars to end rings range from 1150° F. to 1500° F. During brazing, it is necessary to bring the portion of the end ring and rotor bars to be brazed to the melting temperature of the braze filler, which is significantly above the aging temperature of the rotor bars and end rings. Brazing thus subjects the rotor bars and end rings to temperatures that exceed their aging temperature; hence, they are overaged. When the rotor bars or end rings are subject to such temperatures, their mechanical properties are degraded in proportion to the temperature and the time which the rotor bars or end rings are exposed to the elevated temperature. To compound the problem, the rotor core, rotor bars and end rings act as a large heat sink. Thus, heat or energy applied to the joint during brazing is drawn away almost as fast as it is applied if brazing is attempted when the rotor bars and end rings are at room temperature.

U.S. Pat. No. 4,249,098 states that when rotor bars are soldered to end rings, the rotor bars would suffer a loss in strength by soft annealing, and the bottom stacks of the laminated iron core and the insulating layers between them will be subjected to unduly high temperature. That patent discloses a soldering operation in which the end ring is heated to the melting temperature of the solder, causing the solder to melt and fill the gaps between the end faces of the rotor bars and the adjoining surface portions of the end rings.

SUMMARY OF INVENTION

In order to braze the rotor bars to the end rings, it is desirable to minimize the time that portions of the rotor bars and end rings are subject to temperatures above their aging temperatures. It is also desirable to provide a predictable gap between the rotor bars and end ring after they are brazed together to maximize the strength of the brazed joints. The present invention is directed to both of the foregoing objectives.

It is therefore a primary object of the present invention to provide a new and improved method of brazing rotor bars to end rings which produce predictably strong brazed joints without unduly weakening the rotor bars and end rings.

It is another object of this invention to provide rotor cages having improved strength.

In practicing the invention, the parts of the rotor are assembled together in a brazing fixture at room temperature to form a rotor assembly. Thus, the rotor bars are positioned in slots of the rotor core, the end rings are positioned opposite the ends of the rotor bars, braze shims are positioned between the ends of the rotor bars and the end rings.

The brazing fixture holds the parts of the rotor assembly in place during brazing. The brazing fixture has a coefficient of thermal expansion which is lower than the coefficient of thermal expansion of the rotor bars. The term "brazing assembly" is used below to describe the combination of the brazing fixture and rotor assembly.

Prior to brazing, the brazing assembly is preheated to a prebrazing temperature. The prebrazing temperature should be sufficiently below the aged temperature of the rotor bars and end rings so that the temperature of the entire rotor assembly does not rise above that aged temperature during brazing. After the brazing assembly has been preheated to the prebrazing temperature, the difference in thermal expansion of the rotor bars and brazing assembly applies a predetermined amount of pressure on the brazing joint such that after the joint is brazed and has cooled, a 0.002 to 0.006 inch thick braze filler will bond the rotor bar to the end ring.

After the brazing assembly has been preheated, and while it is at the prebrazing temperature, the brazing joints are brazed by a flame brazing process at a temperature sufficient to melt the braze filler and to create a bond between the rotor bar, braze filler and end ring. Although the brazing temperature is higher than the aging temperature of the rotor bar, the mechanical and electrical properties of the rotor bar are not significantly compromised because the heat is applied during brazing for a very short duration on the order of thirty seconds and, as a consequence, is very localized. The heat is quickly dissipated to the cooler sections of the brazing assembly.

The rotor cage that is brazed according to this method has joints which consist of rotor bars joined to end rings with a braze filler having a predetermined thickness.

BRIEF DESCRIPTION OF DRAWINGS

FIGS. 6A, 6B, and 6C are diagrams which show the brazing fixture and rotor assembly in various stages of the brazing operation, and FIGS. 7A, 7B, and 7C are diagrams which show enlarged views of selected portions of FIGS. 6A, 6B, and 6C.

DETAILED DESCRIPTION OF THE INVENTION

The brazing process of this invention includes three major steps: placement of the braze filler; preheating of the brazing assembly; and, brazing, such as by flame brazing.

It is known that the strength of the brazed joint depends on the distance between the rotor bar and the end ring (the "gap".) that contains the braze filler after the brazing operation has taken place, the filler material, and the compositions of the end ring and the rotor bars. For example, when the rotor bars and end rings are made of chrome-copper alloy similar to CDA18200, which is known to those skilled in the art, and the braze filler is BAg 1, the brazed joint has optimal strength when the gap ranges from about 0.002 inches to about 0.006 inches thick.

Figure 1:
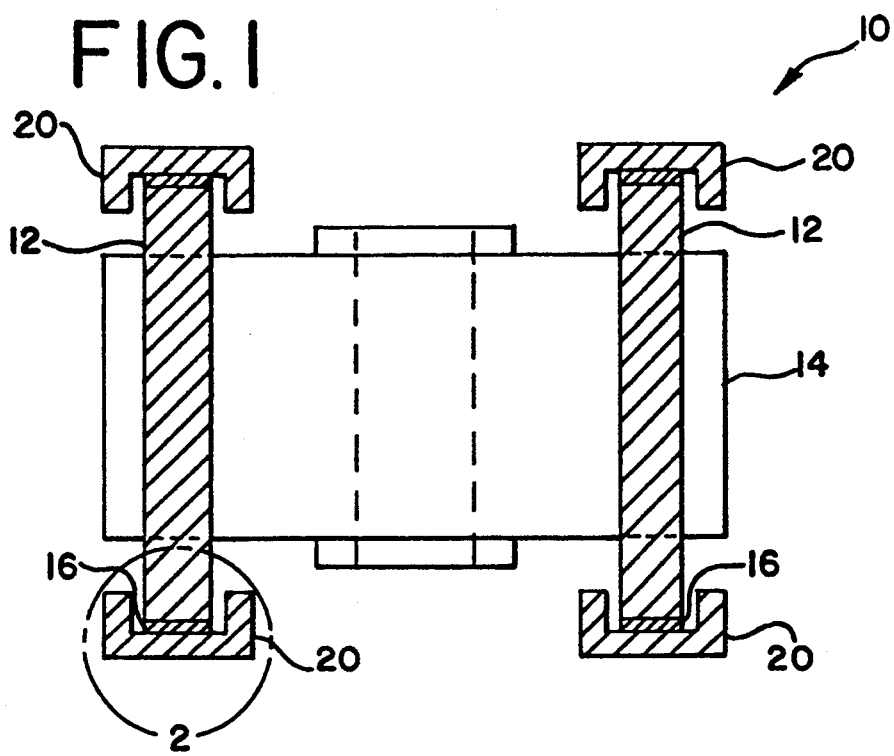
FIG. 1 is a schematic cross sectional view of a pre-brazed rotor assembly, illustrating the placement of the braze shim between the rotor bars and the end rings.
Figure 2:
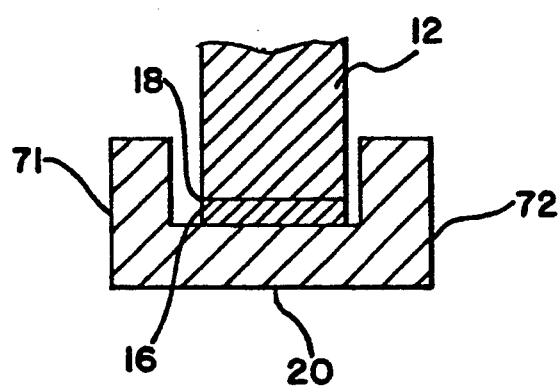
FIG. 2 is an enlarged partial schematic view of the circled portion of FIG. 1 which illustrates the placement of the braze shim between the rotor bar and the end rings.

FIG. 1 schematically illustrates a cross section of rotor assembly 10 for a squirrel cage rotor which depicts the placement of the braze filler. In one embodiment of the invention, chrome-copper alloy rotor bars 12 which have been heat treated at 900 degrees F. are disposed within a laminated iron core 14. A 0.010 inch shim of braze filler 16 is placed between the ends (or end faces) 18 of each rotor bar and the end rings 20 as is shown in FIG. 2. During assembly, the ends of the rotor bars and the bottom of the end ring are painted with type 3A brazing flux, or other suitable brazing fluxes known to those skilled in the art, which help clean the surface of the rotor bars and end rings and help prevent oxidation build up during the prebrazing step (or pre-heat step) discussed below.

Figure 4:
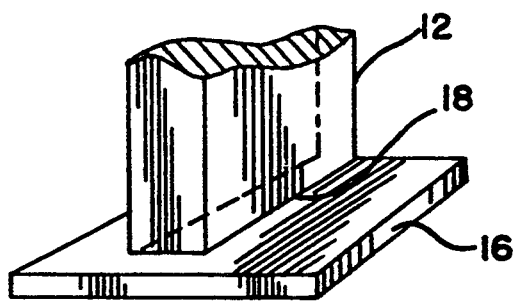
FIG. 4 is a diagram which shows the relative sizes of the braze shim and the rotor bar.
Figure 5:
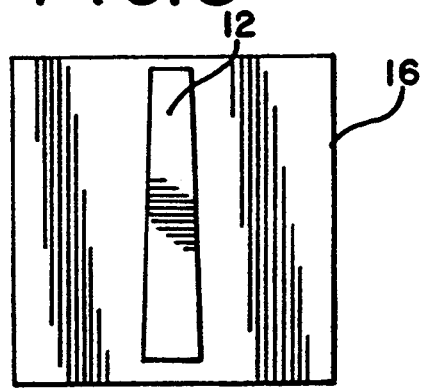
FIG. 5 is a top view of the diagram of FIG. 4.

The braze shim is further illustrated in FIGS. 4 and 5. Braze shim 16 is wider than the end face 18 of the rotor bar 12. The extra braze filler of the wide braze shim 16 provides fillets on the brazed joints.

The pre-heat step of the brazing assembly is required to facilitate a quick brazing process. The rotor core 14, rotor bars 12, end rings 20, and braze fixture 22 act as a large heat sink. If the rotor bars were brazed to the end rings before the rotor assembly was preheated, the heat or energy applied in the brazing process would be drawn away from the joint almost as fast as it was applied.

A quick brazing process is needed to minimize property degradation of the chrome copper bars and end rings. The chrome copper bars and end rings are sensitive to over aging. The chrome copper alloy used in the rotor bars in one example of this invention has been heat treated at 900 degrees F. When this temperature is exceeded, mechanical properties will be degraded in proportion to the temperature above the aged temperature and to the time exposed to that temperature.

Figure 3:
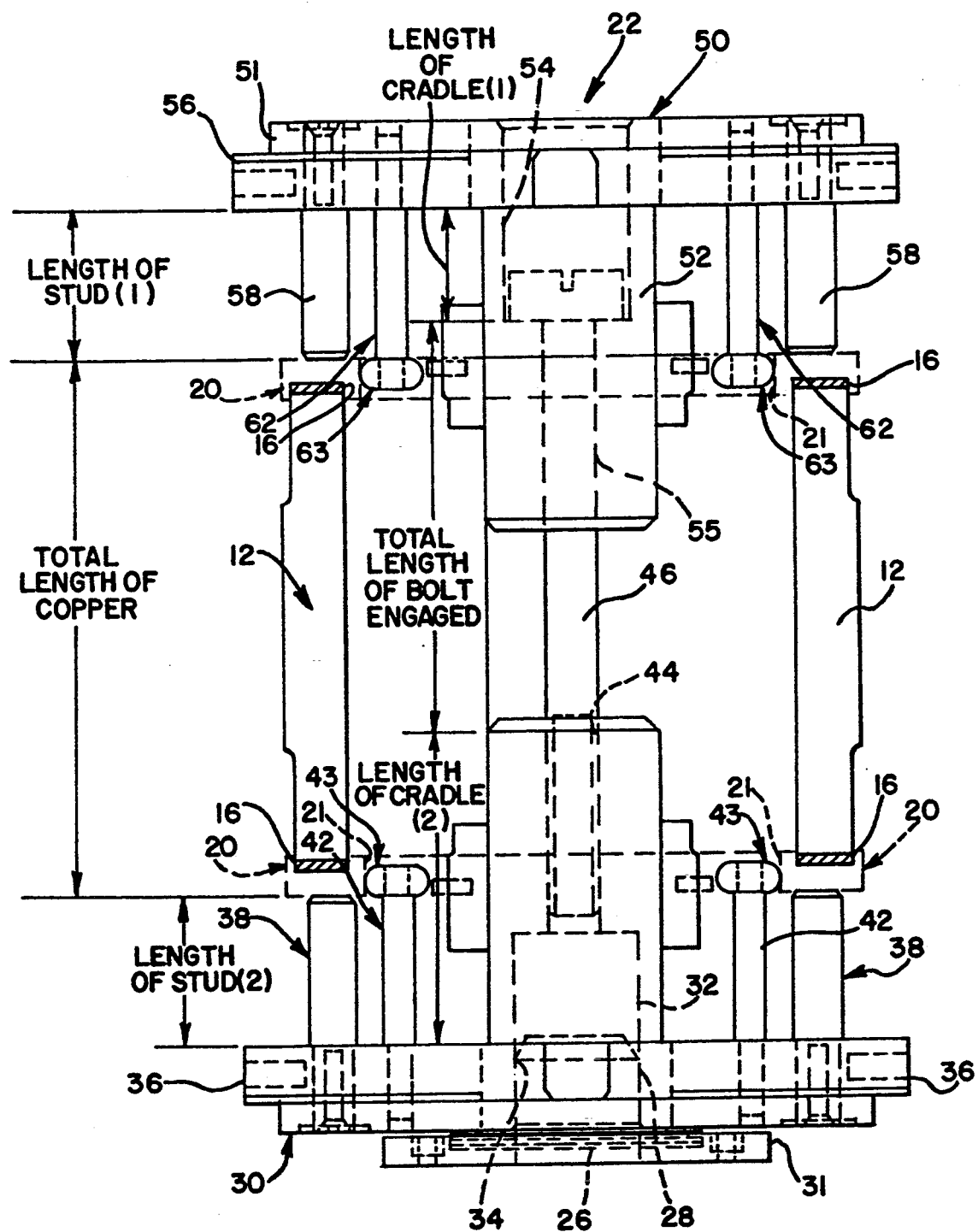
FIG. 3 is a schematic cross sectional view of the prebrazed rotor assembly in a brazing fixture.

Prior to being preheated, the fluxed rotor core assembly (core, bars, end ring, and braze shims) is loaded into the braze fixture 22, as shown in FIG. 3, to form the "brazing assembly" 23.

In a preferred embodiment, braze fixture 22 comprises a base plate 24 having a spindle 26 which is capable of rotating on the base for convenience in brazing the joints of the rotor. Post 28 projects from the center of the spindle 26 and functions to center the lower cradle 30 on the spindle.

Lower cradle 30 comprises a base plate 31 having post 32 in its center. The center of base plate 31 and center post 32 have a hollow aperture 34 adapted to fit over the centering post 28 and a threaded aperture 44 adapted to receive bolt 46. Four support bars 36 are secured on the base plate, extending radially outward and at approximately 90 degree angles with one another. Studs 38 extend generally perpendicular and upward from the support bars 36 and are positioned radially outward from the center of the base plate to support the end ring 20. Positioning posts 42 extending generally perpendicular and upward from the support bars 36 and are axially positioned from the center of the base plate to center the end ring 20 on the braze fixture. Thus, head portions 43 of positioning posts 42 are positioned to abut or be adjacent to the inner radius 21 of end ring 20.

Upper cradle 50 comprises a base plate 51 having center post 52 in its center. The center portion of base plate 51 and center post 52 define a hollow aperture 54 adapted to be larger than the head of bolt 46 and a smaller, unthreaded aperture 55 adapted to receive and position bolt 46 and to permit bolt 46 to rotate. Four support bars 56 are secured on base plate 51, extending radially outward and at approximately 90 degree angles with one another. Studs 58 extend generally perpendicular and downward from the support bars 56 and are positioned radially outward from the center of the base plate to apply pressure to end ring 20 when the brazing assembly 30 is heated. Positioning posts 62 extend generally perpendicular and downward from the support bars 56 and are positioned from the center of the base plate to center the end ring 20 on the braze fixture. Head portions 63 of positioning posts 62 are positioned to abut or be adjacent to the inner radius 21 of end ring 20.

Studs 38 and 58 are preferably made of INCONEL, a commercially available nickel based alloy known to those skilled in the art. It is very stable under repeated applications of high heat, such as the heat to which the studs are exposed when the joints are brazed.

The brazing fixture 22 essentially consists of two separate parts, the upper cradle and the lower cradle, which are joined together by bolt 46. The joined assembly rests on the spindle and can be rotated, which makes it easier to braze each rotor bar/end ring joint. The brazing fixture is preferably made of steel or some other material which has a lower rate of thermal expansion than the rotor bars. Thus, when the brazing assembly is heated in the pre-heat cycle, the brazing fixture 22 passively applies the compressive force by using the different rates of thermal expansion between the copper bars and the steel braze fixture. As the core assembly is pre-heated in the brazing fixture, the copper expands more than the steel and presses against the fixture. The brazing fixture is designed to set the desired pre-load at the pre-heat temperature to provide a compressive load that is sufficient to ensure that the rotor bars sink down to a gap distance of about 0.002 inch to about 0.006 inch after the 0.010 braze shim is melted during brazing. The brazing temperature is higher than the preheat temperature, but this does not load the joint because the heat is very localized.

In order to apply the optimum amount of preload or crush to the brazed joint at preheat temperatures, bolt 46 is sized in accordance with the following formula:

CRUSH = (EXPANSION COPPER OF ROTOR BARS) −

(EXPANSION OF BRAZE FIXTURE)

CRUSH = [(LENGTH COPPER BARS ×

αCOPPER) + 2 × (LENGTH STUDS × θ(STUDS) −

(LENGTH BOLT × αBOLT) −

(LENGTH CRADLE(1) × αCRADLE(1) −

(LENGTH CRADLE(2) × αCRADLE(2))]ΔTEMP

The α symbol in the foregoing equation is the coefficient of thermal expansion. The term ΔTemp is the change in temperature from room temperature to the preheat temperature.

FIGS. 6A–6C are diagrams which illustrate how the thermal growth of the end ring during the preheat and the brazing process produces some rotation in the end rings and rotor bars. The end ring is in an enlarged state when the joint is formed. A near eutectic braze filler such as BAg 1 may be used because there is a large amount of movement in the joint as the ring cools. If a non eutectic filler (a filler with a large two phase region or slush range) were used, the amount of movement in the ring during cooling would produce hot tears in the joint.

In one example of this invention, the rotor bars are about 10.9 inches long and have a heel width of about 0.9 inches. The cold assembly, shown in FIGS. 6A and 7A uses the outer lip 72 of end ring 20 to center the end ring on the rotor bars 12. There is an initial clearance between the inner lip 71 of the end ring and the heel 73 of rotor bar 12 of about 0.060 inches. The brazing process requires that both parts be at the brazing temperature for the braze filler to flow and wet properly, but only the tips of the rotor bars and a small portion of the end ring need to be at the brazing temperature. FIGS. 6B and 7B show the ring during brazing. The end ring 20 is dimensioned to have a small clearance in the range of about 0.010 to about 0.030 inches between the inner lip 71 of end ring 20 and the heal 73 of rotor bar 12 at the time the joint is brazed. A small clearance allows the braze filler to wick up between the heel 73 of the bar 12 and the inner lip 71 on the end ring 20. This supplies a little more braze surface and provides a fillet, that helps inhibit fatigue. The inner lip dimension on the end ring is determined by the following equation:

$$Dia_{inner} = Dia_{core} \frac{(1 + \alpha_{core} \Delta T \text{ preheat})}{(1 + \alpha_{copper} \Delta T \text{ Braze Ave})}$$

In the foregoing formula, α is the coefficient of thermal expansion, the term "ΔT preheat" is the difference between room temperature and the preheat temperature, and the term "ΔT Braze Ave" is the difference between room temperature and the average temperature of the end ring during brazing.

As the rotor assembly 10 cools, the end ring 20 and the core 14 try to return to their original dimension. The end ring 20 cannot return to its original shape because it is constrained by the rotor bars 12 to which it is joined. The end rings 20 thus curl inward from the constraint of the bars and the bars are deflected like a cantilever with an end load and an end moment. FIGS. 6C and 7C show and exaggerates the shape of the end ring 20 and rotor bars 12 after cooling.

The quicker the process and the lower the melting temperature of the braze filler, the more strength the chrome copper rotor bars retains after brazing. In one preferred embodiment of this invention, the braze shim is made of BAg 1 filler. BAg 1 braze filler is nearly eutectic (the melting point and the liquidus point are equal) and it has a relatively low liquidus temperature compared with other braze filler materials. The melting temperature of the BAg 1 filler is 1150 degrees F. It has a composition comprised of approximately 45% silver, 24% cadmium, and about 31% copper. Other braze fillers with similar properties can also be used.

In one embodiment of this invention, in which the rotor bars are about 10 to 11 inches in length and are made of a chrome-copper alloy similar to CDA18200. The space in the end ring between the inner lip 71 and the outer lip 72 is about 1 inch. The end ring is about 0.52 inches thick at its center and about 0.72 inches thick at the inner lip 71 and outer lip 72. The core is made of steel and is 7.4 inches tall and has a diameter of 10.9 inches. The end ring is made of the same chrome-copper alloy as the rotor bars. The brazing assembly 30 is pre-heated to from about 600° F. to about 700° degrees F., and preferably to about 650 degrees F. The temperature to which the rotor core is preheated is a function of the aging temperature of the rotor base and end rings and the thermal mass of the rotor core assembly and braze fixture. The rotor assembly and braze fixture act as a large heat sink. If the parts are not preheated, the heat or energy applied to the joint is pulled away almost immediately. For rotor core assemblies having different dimensions and/or made of different materials, and for braze fixtures of various dimensions, the optimum temperature to which the brazing assembly is preheated may be determined experimentally.

Once the brazing assembly is preheated to the desired temperature the joints (formed by the ends of the rotor bars, the braze shims and the end ring) may be brazed by application of sufficient heat to melt the braze filler, such as by a hand held torch. It takes approximately 30 seconds to braze each joint using a hand held torch after the preheat process.

After the first joint is brazed, the end of the rotor bar and the vicinity of the end ring near the first joint remains near the melting temperature of the braze filler for about 30 seconds. As the consecutive joints are brazed further from the first brazed join, the temperature of the bar and the end ring at the first location drop below the aging temperature of the chromium copper and no further property degradation is experienced. After the entire rotor assembly has been brazed in the example given above, the temperature of the iron core, rotor bars and end rings gradually increase from the pre-heat temperature of 650 degrees F to approximately 800 degrees F. this temperature has no adverse effects on the chrome copper alloy of the rotor bars because it is below the aging temperature of 900 degrees F.

We claim:

1. Apparatus for maintaining a predetermined pressure on a squirrel cage rotor assembly during the process of brazing rotor bars to end rings to form a brazed joint, which rotor assembly includes rotor bars disposed in a rotor core and having their ends positioned on braze shims of braze fillers situated between the rotor bars and the end rings, comprising positioning means for positioning the rotor assembly in the apparatus;

pressure means for applying a predetermined amount of pressure on the end rings, rotor bars and braze shims of the rotor assembly so that when the ends of the rotor bars, braze shims and end rings are brazed to form a joint, the resulting brazed joint has a predetermined thickness.

2. The apparatus of claim 1 in which the pressure means has a coefficient of thermal expansion that is less than the coefficient of thermal expansion of the rotor bars so that when the rotor assembly is positioned in the apparatus in an environment where the temperature is elevated, the pressure means expands less than the rotor bars causing a predetermined amount of pressure to be applied to the braze shims to produce a brazed joint in which the braze filler has a predetermined thickness.

* * * * *